United States Patent [19]

Khirwadkar

[11] Patent Number: 4,474,519
[45] Date of Patent: Oct. 2, 1984

[54] VEHICLE FOR HEAVY LOADS

[76] Inventor: Prabhakar R. Khirwadkar, Siechenreuteweg 20, D-8940 Memmingen 3, Fed. Rep. of Germany

[21] Appl. No.: 332,545

[22] Filed: Dec. 21, 1981

[30] Foreign Application Priority Data

Aug. 28, 1981 [DE] Fed. Rep. of Germany ....... 3134003

[51] Int. Cl.³ ............................................. E04G 21/14
[52] U.S. Cl. ....................................... 414/12; 269/71;
  414/589; 414/744 R; 414/749
[58] Field of Search ...................... 414/10, 11, 12, 589,
  414/590, 676, 679, 744 R, 749, 750, 787;
  198/768; 269/71, 73; 254/84

[56] References Cited

U.S. PATENT DOCUMENTS

| | | | |
|---|---|---|---|
| 3,409,158 | 11/1968 | Lull | 414/11 X |
| 3,524,556 | 8/1970 | Miller | 414/589 |
| 3,779,399 | 12/1973 | Shigeno et al. | 414/787 |
| 4,324,302 | 4/1982 | Rabinovitch | 180/86 |

FOREIGN PATENT DOCUMENTS

| | | | |
|---|---|---|---|
| 2346106 | 4/1974 | Fed. Rep. of Germany | 414/679 |
| 2067932 | 8/1981 | United Kingdom | 269/73 |
| 468879 | 7/1975 | U.S.S.R. | 414/589 |
| 558788 | 7/1977 | U.S.S.R. | 414/729 |

*Primary Examiner*—Leslie J. Paperner
*Attorney, Agent, or Firm*—Bruce K. Thomas

[57] ABSTRACT

A movable frame slidably supported on a mobile chassis, pivot points on each of opposite sides of the movable frame, a pair of extendable members pivotally mounted at one end to each of said pivot points, the other ends of each extendable member being pivoted at spaced points on the chassis and means for individually and independently actuating the extendable members to position the movable frame about the top side of the chassis. The movable frame can rotatably support a load-carrying table and polytetrafluoroethylene plates may be used as bearing surfaces between the chassis and the movable frame and the movable frame and the rotatable table.

8 Claims, 8 Drawing Figures

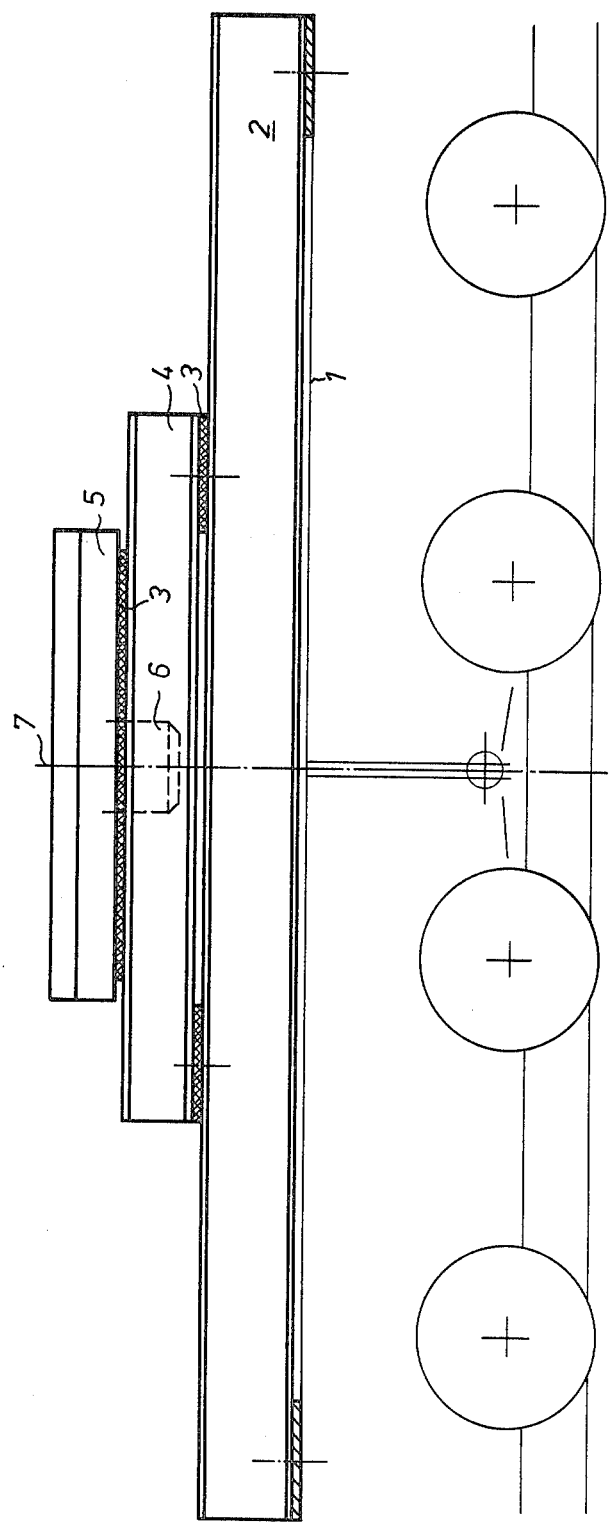

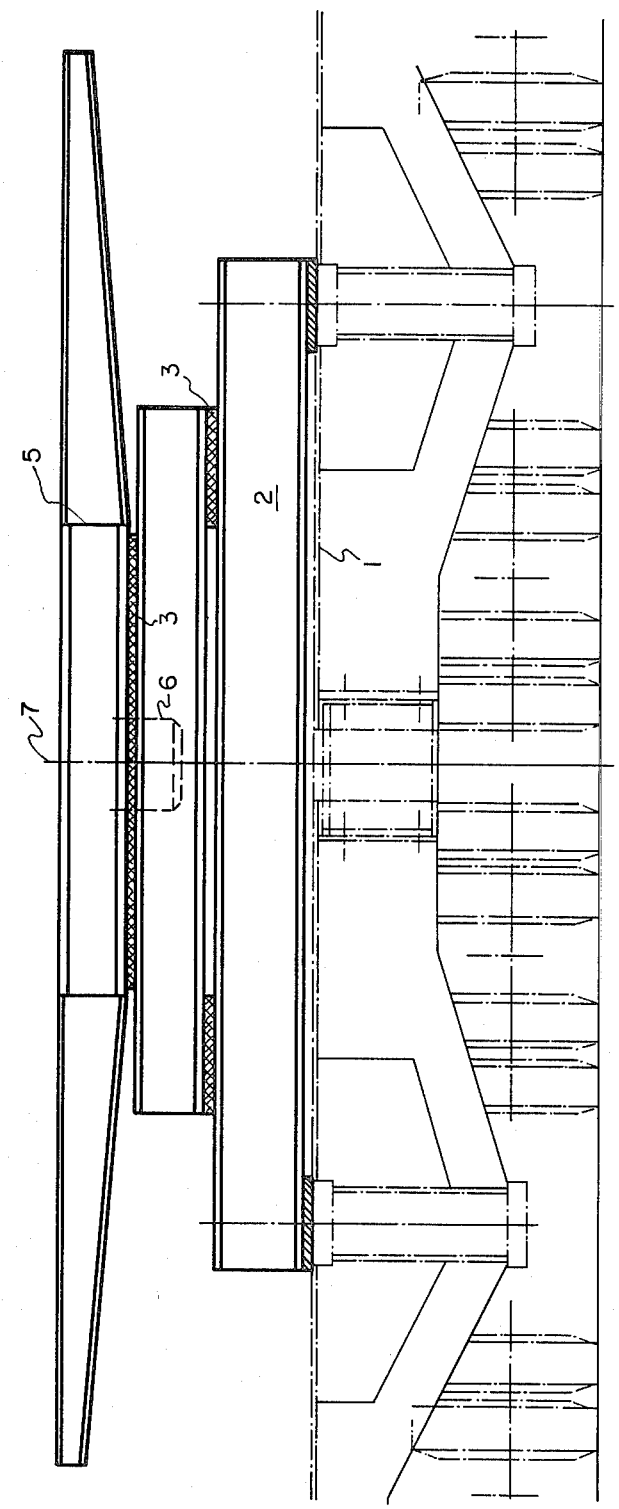

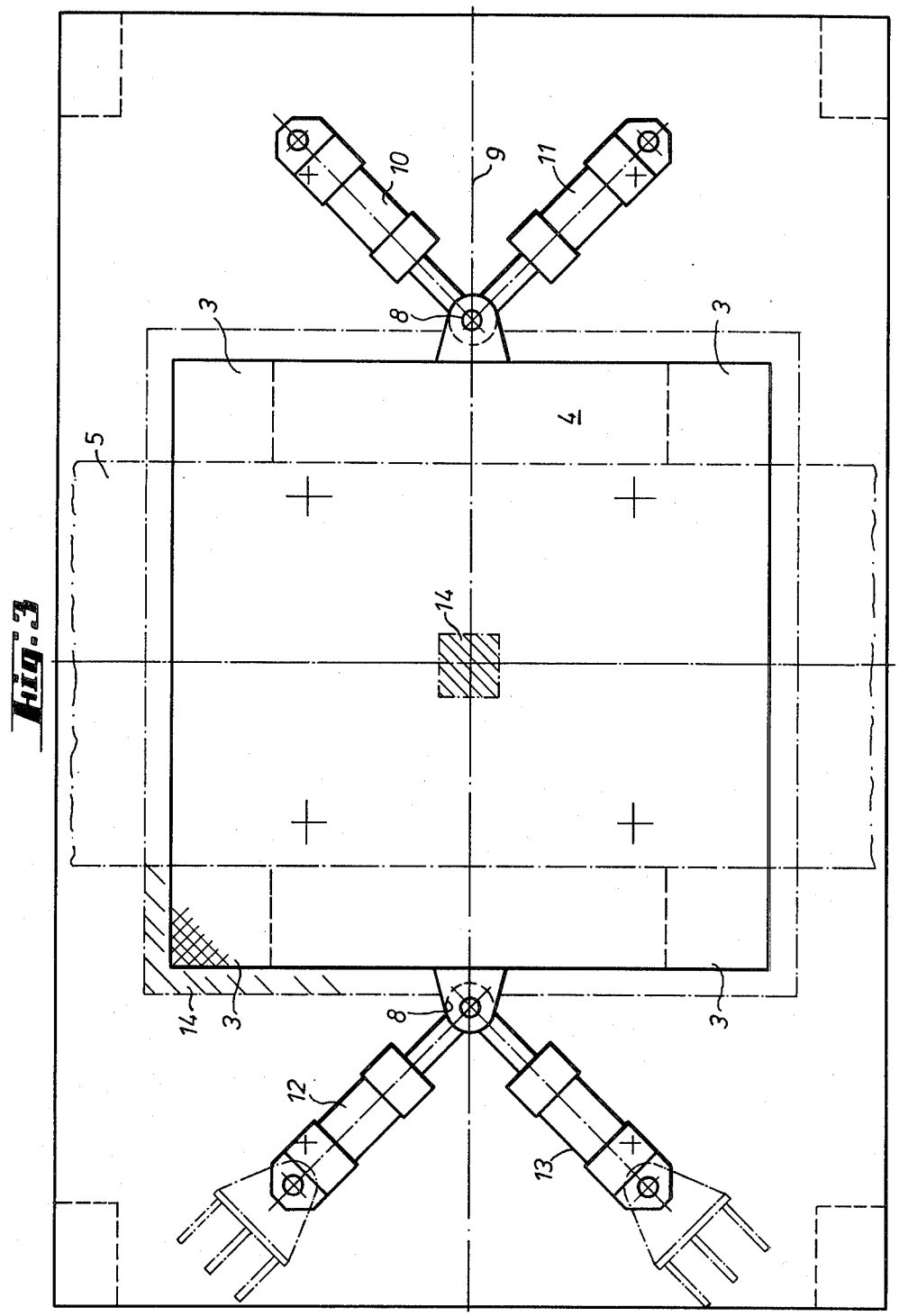

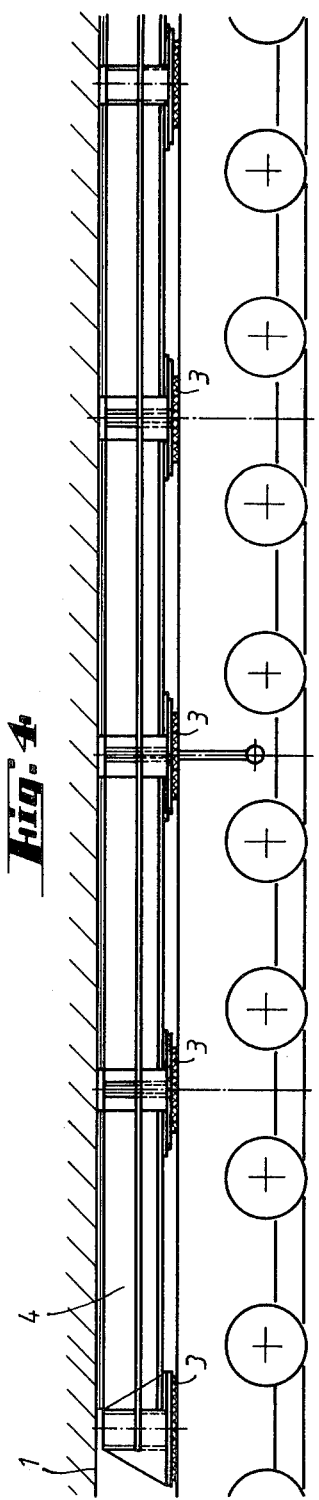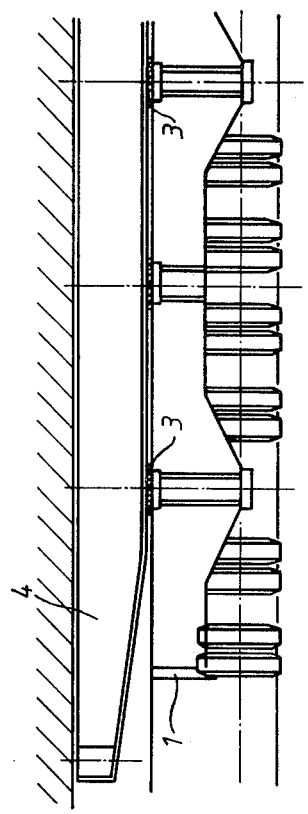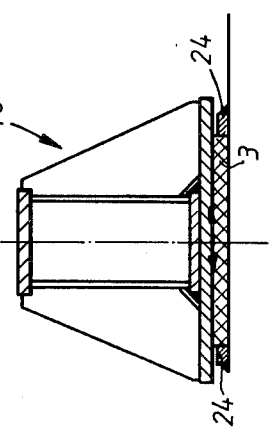

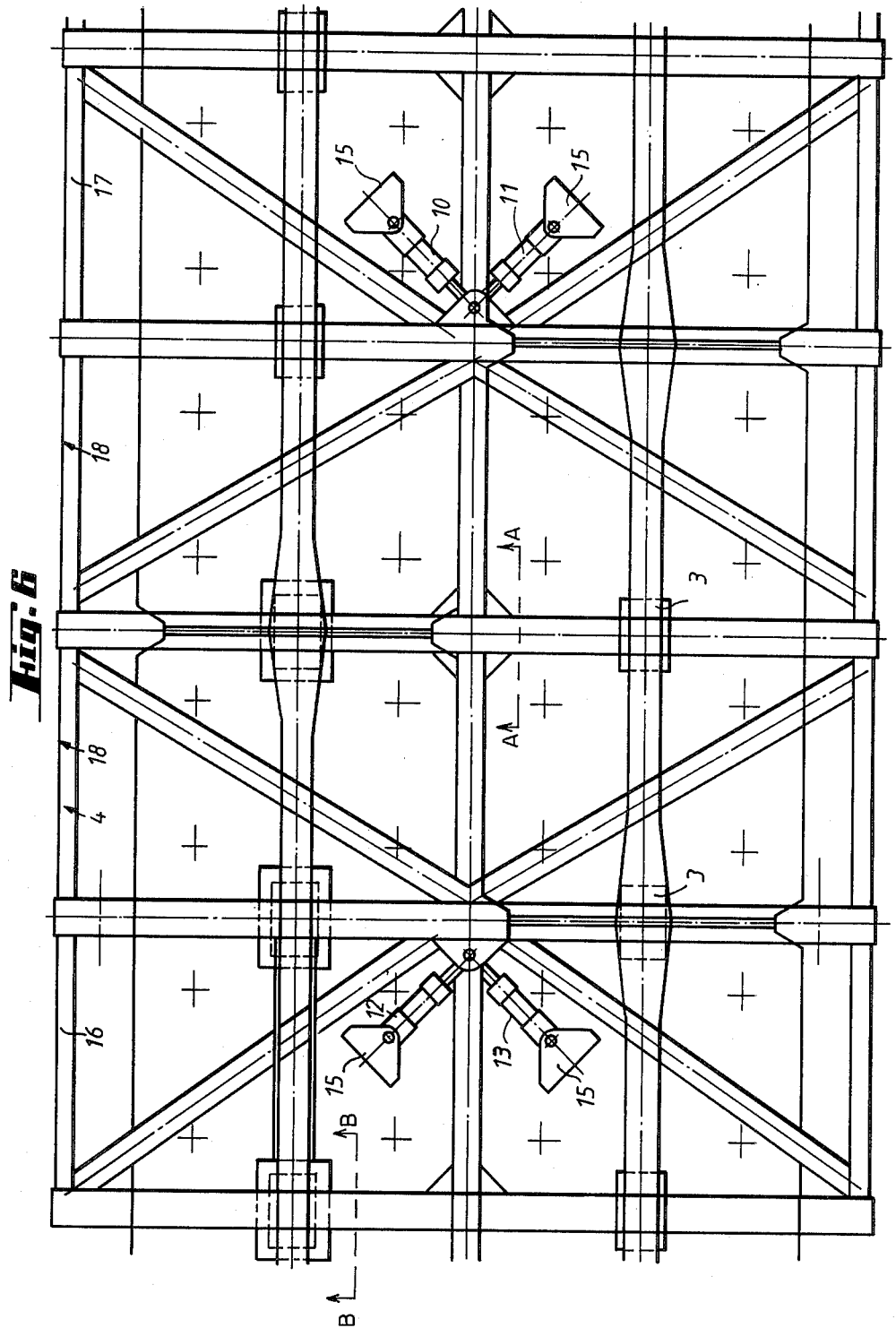

VEHICLE FOR HEAVY LOADS

The invention relates to a vehicle for heavy loads having a chassis and means to position the heavy load prior to being lifted to the ground. More especially the invention relates to a road vehicle of such a kind. The invention may, however, also be used in the case of rail-road tracks.

On vehicles that travel on such vehicles there exists in recent times the necessity to have movable devices on the vehicles which are in a position to arrange heavy loads (for example installations, modules and so forth) exactly side-by-side upon being set down. In this way the result is to be achieved that, through the setting down of several such installations (factory parts and so forth) the coupling together and fastening of the base frames and installation parts is made possible, including possibly the piping, and thus functioning factories and installations arise. The movement should, in this respect, amount to about ±150 mm in the longitudinal direction and transverse direction.

The problem underlying the invention is, therefore, to propose a vehicle for heavy loads with which it is possible to move the heavy loads transported on the vehicle very precisely within a predetermined area into any desired position.

To solve this problem, the invention is characterised in that a movable frame on which drives act is displaceable in a plane parallel to that of the chassis on the upper side thereof.

As a result of these measures, the movable frame and, with it, the load present directly or indirectly on it may be moved within a predetermined area parallel to the plane of the chassis into any desired position.

There are several possibilities for the drives. For example, electric, pneumatic or hydraulic drives in the longitudinal direction and transverse direction may shift the movable frame with regard to the chassis and thereby solve the problem of the invention. It is preferred if, at two mutually opposite sides of the chassis, for this purpose respectively two piston/cylinder units act on a common hinge point, the lines of action of which are substantially at right angles to each other. As a result of a suitable action-upon these piston/cylinder units, the movable frame may occupy any desired position within the predetermined area above the chassis. This is explained later on in yet more detail with reference to an exemplified embodiment.

The force conditions are particularly favourable if, as is preferred, the angle bisector of the lines of action of the piston/cylinder units coincides with the longitudinal axis or the transverse axis of the vehicle.

It is moreover preferred to employ a rotary table for the reception of the load mounted for rotation on the movable frame. The rotary table may be longer than the rectangular and preferably square frame.

It is furthermore preferred if beteeen the frame and the movable frame and possibly between the movable frame and the rotary table there is in each case provided a plate made of sliding material which permits the displacements and may absorb the forces occurring in this respect. These plates consist preferably of polytetrafluoroethylene (p.t.f.e).

The movable frame may be fastened directly, or by way of a base frame, to the chassis of the vehicle. Insofar as it is desired to economize on the said base frame, which naturally brings advantages from a cost point of view, the plates made on sliding material as well as the abutments of the drives may be connected releasably to the upper side of the chassis. Otherwise, a base frame, which is for its part preferably displaceable over the chassis, may be provided between the chassis and the movable frame.

For the purpose of adapting the movable frame to the respectively desired size it is preferred for the movable frame to be assembled in modular-like manner from structural units.

For this it is preferred if, at the contiguous sides of the structural units, laterally open receivers or associated guide bolts are provided. These bring about, upon the assembly of the structural units, the correct fit thereof. They may then be bolted together or otherwise connected in a suitable and loadable manner.

The invention will be described in more detail with reference to the accompanying drawings.

FIG. 1 shows schematically a side view of a novel vehicle, in which for simplification, the piston/cylinder units are not shown;

FIG. 2 shows a front view of the vehicle in accordance with FIG. 1;

FIG. 3 shows a plan view of the vehicle in accordance with FIGS. 1 and 2;

FIG. 4 shows a view in accordance with FIG. 1 in the case of a second embodiment;

FIG. 5 shows a view in accordance with FIG. 2 in the case of this second embodiment of the novel vehicle;

FIG. 6 shows a plan view in accordance with FIG. 3 in the case of this second embodiment of the road vehicle;

FIG. 7 shows a section along the line A—A of FIG. 6;

FIG. 8 shows a section along the line B—B of FIG. 6.

FIGS. 1 to 3 illustrate a road vehicle for heavy loads having a chassis 1 mounted on a plurality of axes at least one base frame 2 is mounted on the chassis 1. A movable frame 4 is connected by polytetrafluoroethylene (p.t.f.e) plates 3 to the base frame 2. On the upper side of the movable frame 4 is mounted also on a further p.t.f.e. plate 3 a rotary table 5 pivotable on a shaft 6 about a vertical axis 7.

The plates 3 allow a pivoting of the movable frame 4 on the base frame 2 or about the table 5 on the movable frame 4.

For displacement of the movable frame 4 two pivots 8 (FIG. 3) are provided which in the initial position of the movable frame 4 as shown in FIG. 3, lie on the longitudinal axis 9 of the vehicle. The movable frame is square. Two piston/cylinder units 10,11,12,13 are connected at right angles to each pivot. The angle bisecting the units 10 to 13 in the initial position shown in FIG. 3 coincides with the longitudinal axis 9.

If the movable frame 4 is to be displaced in any desired position within an area indicated by the hatching 14 (see FIG. 3), the units 10 to 13 are operated as follows. If for example, the two front units 12,13 are held in the shown initial position then the front pivot point 8 forms a swivel axis about which as a result of a suitable actuation of the rear units 10 and 11 the movable frame can be swung.

As a result of another actuation of the units 10 to 13, the movable frame 4 may also be shifted in the longitudinal direction or in the transverse direction of the vehicle.

Additionally, the rotary table 5 may be rotated about its axis 7, with the aid of a suitable drive which is not shown in the drawings.

A second embodiment of the novel road vehicle in accordance with FIGS. 4 to 8 will be described hereinafter. This is basically of a construction similar to the first embodiment in accordance with FIGS. 1 to 3. but, the base frame 2 is abolished, and the chassis 1 assumes the function of the base frame 2 employed in the first embodiment. The moving frame 4 is in the case of this second embodiment in accordance with FIGS. 4 to 8 fastened by way of the plates 3 directly displaceably on the chassis 1. The piston/cylinder units 10 to 13 have abutments 15 which are welded or bolted to the chassis 1. Also the plates 3 made from the p.t.f.e. material are provided releasably on the chassis 1.

The movable frame 4 consists, in the case of this embodiment, of several structural units, namely a basic component 16 with the two units 12,13 and a further basic component 17 with the units 10,11.

The two basic components 16 and 17 are either connected directly to one another, or by way of at least one intermediate component 18. Two such intermediate components are shown.

The connection of the components 16 to 18 to one another is effected, in accordance with FIG. 7 by way of a receiver 20 which is provided in the one side wall 19 of the one component 16 and which is open to the side towards a guide bolt 21.

This guide bolt is fastened to a side wall 22 of the other component 18 and projects beyond this, as is shown in the drawings in FIG. 7.

The two components are bolted to one another, by boltings indicated at position 23, above and below the receiver 20 with the guide bolt 21.

FIG. 8 shows one end of the left-hand basic component 16 in a section. Also evident from this is the plate 3 made from the p.t.f.e. material which is guided in the transverse direction between guide blocks 24.

I claim:
1. A vehicle for heavy loads having a chassis,
a movable frame on top of said chassis,
motive power units engaged between said frame and said chassis and being displaceable in a plane parallel to that of said chassis,
a pair of said motive power units being pivotally mounted on a common pivot axis substantially perpendicular to each of two mutually opposite sides of said movable frame,
said common pivot axes each being substantially perpendicular to the plane of said movable frame,
the axes of reciprocation of each pair of said power units being at an angle to each other, and
the common pivot axes of said motive power units being substantially aligned with the longitudinal axis of said movable frame whereby a two-dimensional extended area of movement is provided beyond each of said mutually opposite sides and the remaining sides of said movable frame.

2. A vehicle in accordance with claim 1, in which the opposite ends of said motive power units are pivotally mounted to said chassis at fixed points whereby the initial axes of reciprocation of each pair of power units are at substantially right angles to each other.

3. A vehicle in accordance with claim 1 in which
a rotary table is carried by said movable frame and a bearing plate composed of polytetrafluoroethylene is provided between the top of said chassis and the bottom of said rotary table.

4. A vehicle in accordance with claim 1 in which circumferentially spaced bearing plates composed of polytetrafluoroethylene are provided between said movable frame and said chassis.

5. A vehicle in accordance with claim 1 in which
said common pivot axes for said motive power units are substantially aligned with the longitudinal axis of said vehicle.

6. A vehicle in accordance with claim 1 in which
said common pivot axes for said motive power units are substantially aligned with the transverse axis of said vehicle.

7. A vehicle in accordance with claim 1 in which
said movable frame rests on at least one bearing plate composed of polytetrafluoroethylene carried by said chassis.

8. A vehicle for heavy loads having a chassis,
a movable frame carried on top of said chassis,
motive power units engaged between said frame and said chassis and being displacable in a plane parallel to that of the chassis,
a pair of said motive power units being pivotally mounted at a common pivot axis to each of two mutually opposite sides of the movable frame; the axes of reciprocation of each pair of said power units being at an angle to each other,
said movable frame being constructed of at least a pair of structural units,
the junctures between the contiguous sides of said units including a pair of spaced parallel walls,
one said walls carrying a guide pin, and
the other said walls having a bore hole whereby said guide pin and bore hole engage, thereby holding the walls of said structural units rigid and aligned for bolting.

* * * * *